United States Patent
Chen et al.

[11] Patent Number: 5,563,980
[45] Date of Patent: Oct. 8, 1996

[54] BRUSHLESS DC MOTOR SPEED CONTROLLER

[75] Inventors: Tshaw-Chuang Chen; Hong-Shi Chang; Huan-Jen Yang, all of Hsinchu, Taiwan

[73] Assignee: Industrial Technology Research Institute, Hsinchu Hsien, Taiwan

[21] Appl. No.: 355,735

[22] Filed: Dec. 14, 1994

[51] Int. Cl.$^6$ .................................................. H02P 5/17
[52] U.S. Cl. ..................... 388/811; 388/815; 388/906; 388/908; 388/911; 318/609
[58] Field of Search .................. 388/809–824, 388/902, 906, 900, 908, 911; 318/606–610

[56] References Cited

U.S. PATENT DOCUMENTS

| 3,970,931 | 7/1976 | Novak | 318/685 X |
|---|---|---|---|
| 4,227,126 | 10/1980 | Denecke | 318/55 |
| 4,562,549 | 12/1985 | Tanaka et al. | |

*Primary Examiner*—David S. Martin
*Attorney, Agent, or Firm*—W. Wayne Liauh

[57] ABSTRACT

Provided is a brushless DC motor speed controller in which the speed feedback signal needed for speed control is obtained from the commutation signals generated by the magnetic-pole sensor in the brushless DC motor. The brushless DC motor speed controller includes an edge detector, which generates a pulse each time a rising or falling edge is detected in the signal from the magnetic-pole sensor of the brushless DC motor. A frequency multiplier is used to multiply the frequency of the pulse train from said edge detector. A frequency-to-voltage converter is used to convert the output pulse train from said frequency multiplier into a positive analog voltage, with the level of the positive analog voltage being in proportion to the speed of the brushless DC motor. A motor rotating direction detecting circuit receives the output signal from said magnetic-pole sensor and thereby detects in which direction the brushless DC motor currently rotates. A feedback signal polarity analog multiplexer receives the positive analog voltage from the frequency-to-voltage converter, responsive to the rotating direction detected by said motor rotating direction detecting circuit, thereby generating a positive or a negative analog voltage as speed feedback signal. A speed compensator receives a speed command input and the speed feedback signal and thereby controls the level of the DC voltage supplied to the brushless DC motor.

5 Claims, 10 Drawing Sheets

(a)

(b)

BRUSHLESS DC MOTOR SPEED CONTROLLER

BACKGROUND OF THE INVENTION

The present invention relates to brushless DC motors, and more particularly, to a brushless DC motor speed controller used for controlling the motor speed.

In conventional brushless DC motors, a DC tachometer or encoder is utilized as a speed sensor to achieve the purpose of speed control. In analog drivers to drive brushless DC motors, if a DC tachometer is utilized as the speed sensor, the feedback signal and the analog speed command enter the speed compensator concurrently. If an encoder is utilized as the speed sensor, the input signal is a pulse train, which is processed by a frequency-to-voltage converter to obtain an analog voltage. This analog voltage along with the analog speed command are then input to the speed compensator. When either of the aforementioned two methods is used for speed control, the brushless DC motor must be installed with a speed sensor. However, in certain applications such as drilling machines and automatic guided vehicles, in which speed control is required while large speed-fluctuation or slow response time is allowed, a simpler way of obtaining the speed feedback signal is feasible.

SUMMARY OF THE INVENTION

It is therefore a primary objective of the present invention to provide a brushless DC motor speed controller in which the speed feedback signal needed for speed control is obtained from the commutation signals generated by the magnetic-pole sensor in the brushless DC motor. Since it is unnecessary to install a speed sensor on the motor, the cost of manufacturing will be significantly reduced.

In accordance with the foregoing and other objectives of the present invention, a brushless DC motor speed controller is provided. The brushless DC motor speed controller includes an edge detector, which generates a pulse each time a rising or falling edge is detected on the signal from the magnetic-pole sensor of the brushless DC motor. A frequency multiplier is used to multiply the frequency of the pulse train from said edge detector. A frequency-to-voltage converter is used to convert the output pulse train from said frequency multiplier into a positive analog voltage, with the level of positive analog voltage being in proportion to the speed of the brushless DC motor. A motor rotating direction detecting circuit receives the output signal from said magnetic-pole sensor and thereby detects which direction the brushless DC motor currently rotates. A feedback signal polarity analog multiplexer receives the positive analog voltage from the frequency-to-voltage converter, responsive to the rotating direction detected by said motor rotating direction detecting circuit, thereby generating a positive or a negative analog signal as speed feedback signal. A speed compensator, being a proportional amplifier, receives speed command input and the speed feedback signal, and thereby controls the level of the DC voltage supplied to the brushless DC motor.

BRIEF DESCRIPTION OF THE DRAWINGS

The present invention can be more fully understood by reading the subsequent detailed description of the preferred embodiments thereof with references to the accompanying drawings, wherein.

DETAILED DESCRIPTION OF THE PREFERRED EMBODIMENTS

Figure 1:
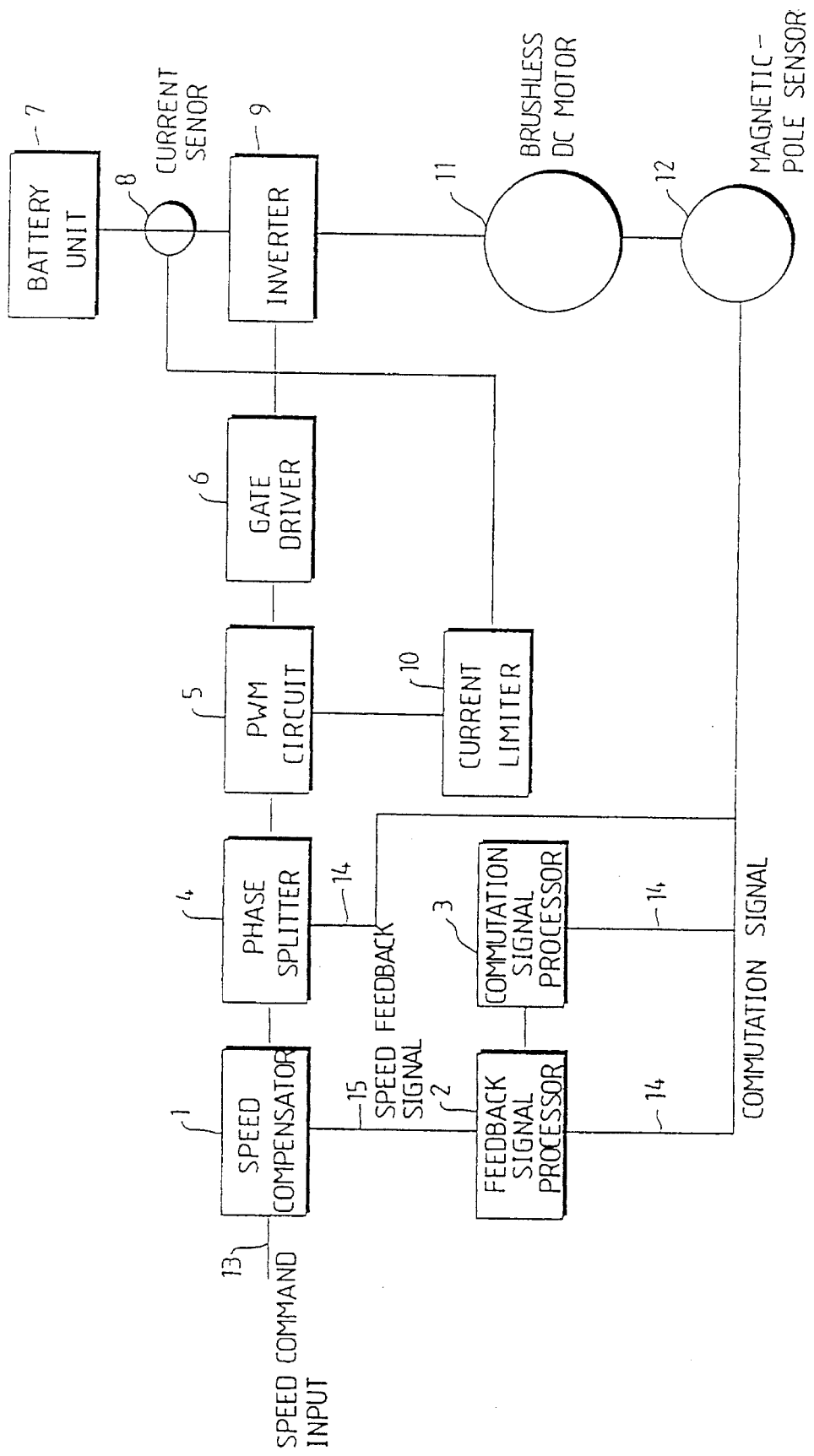
FIG. 1 is a control block diagram of a brushless DC motor with a speed controller according to the present invention.

Refer to the control block diagram of FIG. 1 of the brushless DC motor with a speed controller which is composed of three parts: a speed compensator 1, a feedback signal processor 2, and a commutation signal processor 3. The detailed block structure of present invention is referred to in FIG. 2. The conventional parts of the brushless DC motor are described in FIG. 1 where the numeral 4 designates a phase splitter, 5 designates a pulse width modulated (PWM) circuit, 6 designates a gate driver, 7 designates a battery unit used as the DC power source, 8 designates a current sensor, 9 designates an inverter, 10 designate a current limiter, 11 designates a brushless DC motor, 12 designates a magnetic-pole sensor, 13 designates a speed command input, 14 designates commutation signals from the magnetic pole sensor 12, and 15 designates a speed feedback signal. The phase splitter 4 is used to determine which power transistors in the inverter 9 are to be conducted to, based on the commutation signals 14 from the magnetic pole sensor 12, so as to allow the current from the battery unit 7 to be supplied to the brushless DC motor 11. The current limiter 10 is used to limit the current flowing through the brushless DC motor 11. When the current reaches an upper limit, the duty cycle of the pulses from the PWM circuit 5 will be limited.

The magnetic-pole sensor 12 utilized in the brushless DC motor speed controller of the present invention provides three functions:

1. It provides the commutation signals 14 to the phase splitter 4 so as to allow the phase splitter 4 to determine which power transistors in the inverter 9 are to be conducted to allow current from the battery unit 7 to be sent to the brushless DC motor 11.

2. It also provides the commutation signals 14 to the commutation signal processor 3, which processes the commutation signals 14 through an edge detector 17 (FIG. 2), a frequency multiplier 18, and a frequency-to-voltage converter 19 to obtain a positive analog voltage in proportion to the speed of the motor.

3. In addition, it provides the commutation signals 14 to the feedback signal processor 2, which includes a rotating direction detecting circuit 20 used to detect the rotating direction (clockwise or counterclockwise) of the motor, and a phase inverter 21 and an analog multiplexer 22 to process the positive analog signal from the commutation signal processor 3 to obtain a positive or negative analog voltage used as speed feedback signal.

When a brushless DC motor rotates in the CCW or directions, the commutation signals have different waveforms as respectively shown in FIGS. 3a–3b, wherein FIG. 3a shows the waveform of the CC commutation signals and FIG. 3B shows that of the CW commutation signals. For example, in a four-pole brushless DC motor, the commutation signals are processed by a differential circuit to obtain its rising and falling edges. For each revolution of the motor, 12 pulses can be obtained without the use of a frequency multiplier, the 12 pulses of output signal applied to the frequency-to-voltage converter directly to obtain an analog feedback signal will contain high ripples that cause great fluctuations in the rotation of a motor at low speed.

Figure 2:
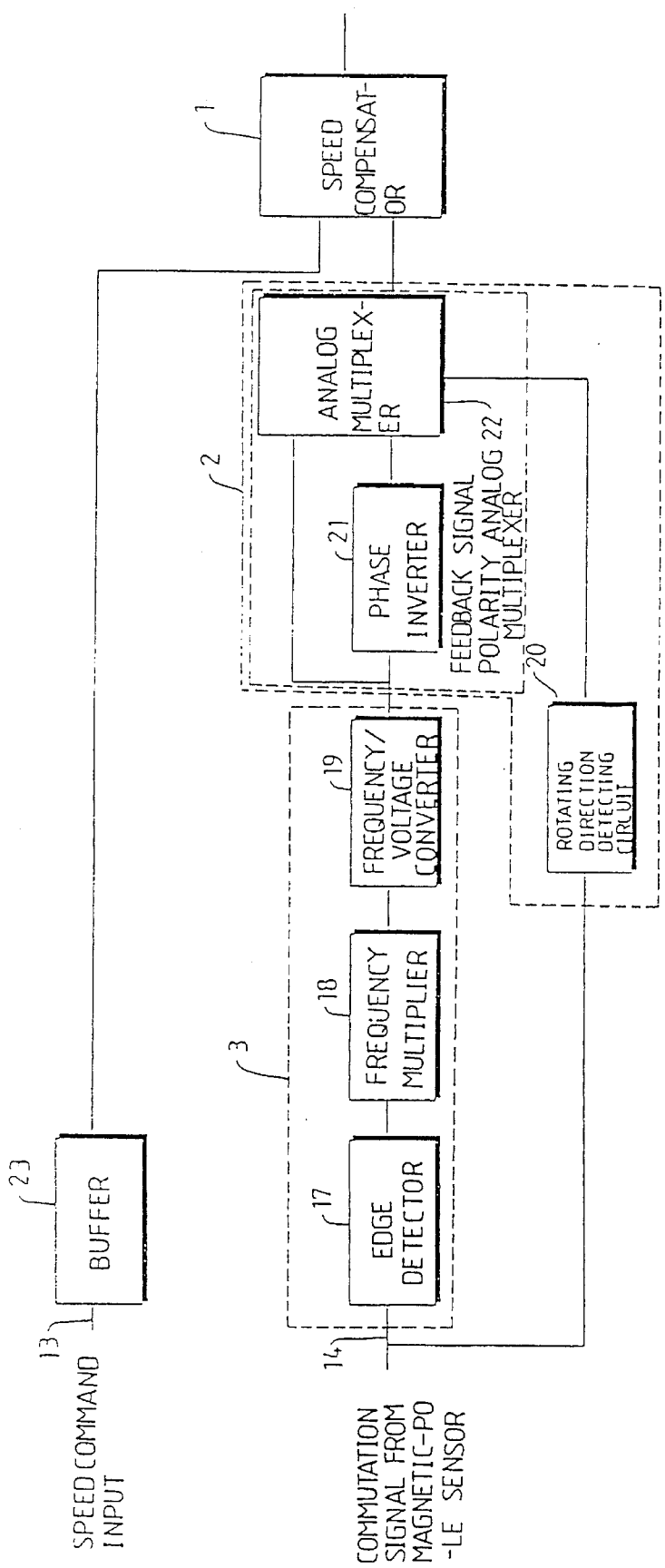
FIG. 2 is a block diagram, showing detailed block structures of the brushless DC motor speed controller of the present invention.

To solve the foregoing problem, as shown in FIG. 2, the commutation signals 14 from the magnetic-pole sensor 12 are processed by the edge detector 17, which are differential circuits that generate pulses when rising and falling edges are detected in the commutation signals waveform. The generated pulses are processed subsequently by the frequency multiplier 18 in a phase-locked loop (PLL) and the frequency-to-voltage converter 19 to obtain a positive analog voltage in proportion to the motor speed. The output pulse train of the edge detector 17 is multiplied in frequency in the phase-locked loop by inserting a frequency divider into the feedback loop between the output of the voltage-controlled oscillator (VCO) and the input of the phase comparator. Assume the pulse train input to the frequency multiplier 18 has a frequency of $f_i$, then $$f_i = \frac{N \times 6XP}{120} \text{ (Hz)}$$

where

N: the motor speed in RPM
P: number of poles in the motor

If the multiplication factor of the frequency multiplier 18 is M, then the frequency of the output will be:

$$f_o = M \times f_i$$

In the present invention, phase-locked loop is utilized to multiply the frequency of the input pulse train. Compared to the brushless DC motor in which phase-locked loop is not used to multiply the frequency of the input pulse train, the present invention provides an advantage in that it allows brushless DC motor to exhibit less speed fluctuation when the motor rotates at low speed.

Figure 3:
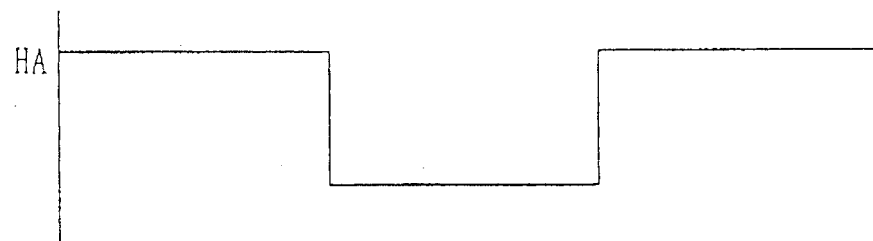
FIG. 3 is a signal diagram, showing the waveforms of counterclockwise (CCW) and clockwise (CW) commutation signals.
Figure 3:
Figure 3:
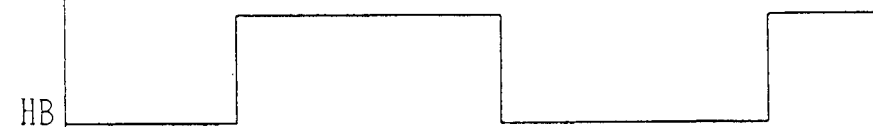
Figure 3:

In FIG. 2, the numeral 23 designates a buffer. In many applications the brushless DC motor rotates both in the CCW and the CW direction. Accordingly, in order to obtain a negative feedback control, the speed feedback signal can be positive or negative. As shown in FIG. 3, when the three-phase brushless DC motor is rotating CCW or CW direction, the commutation signals from the magnetic-pole sensor 12, based on the phase of commutation signals, can generate a control signal that causes the positive analog voltage from the commutation signal processor 3 to be processed through the phase inverter 21 and the analog multiplexer 22 to obtain a positive or negative analog voltage as the speed feedback signal. The speed feedback signal is then input to the speed compensator 1, which can be a proportional amplifier or a proportional-integral amplifier. Processing the speed feedback signal and the speed command input, the speed compensator 1 generates a control signal used to control the level of the voltage supplied to the brushless DC motor 11.

Figures 1, 4A:
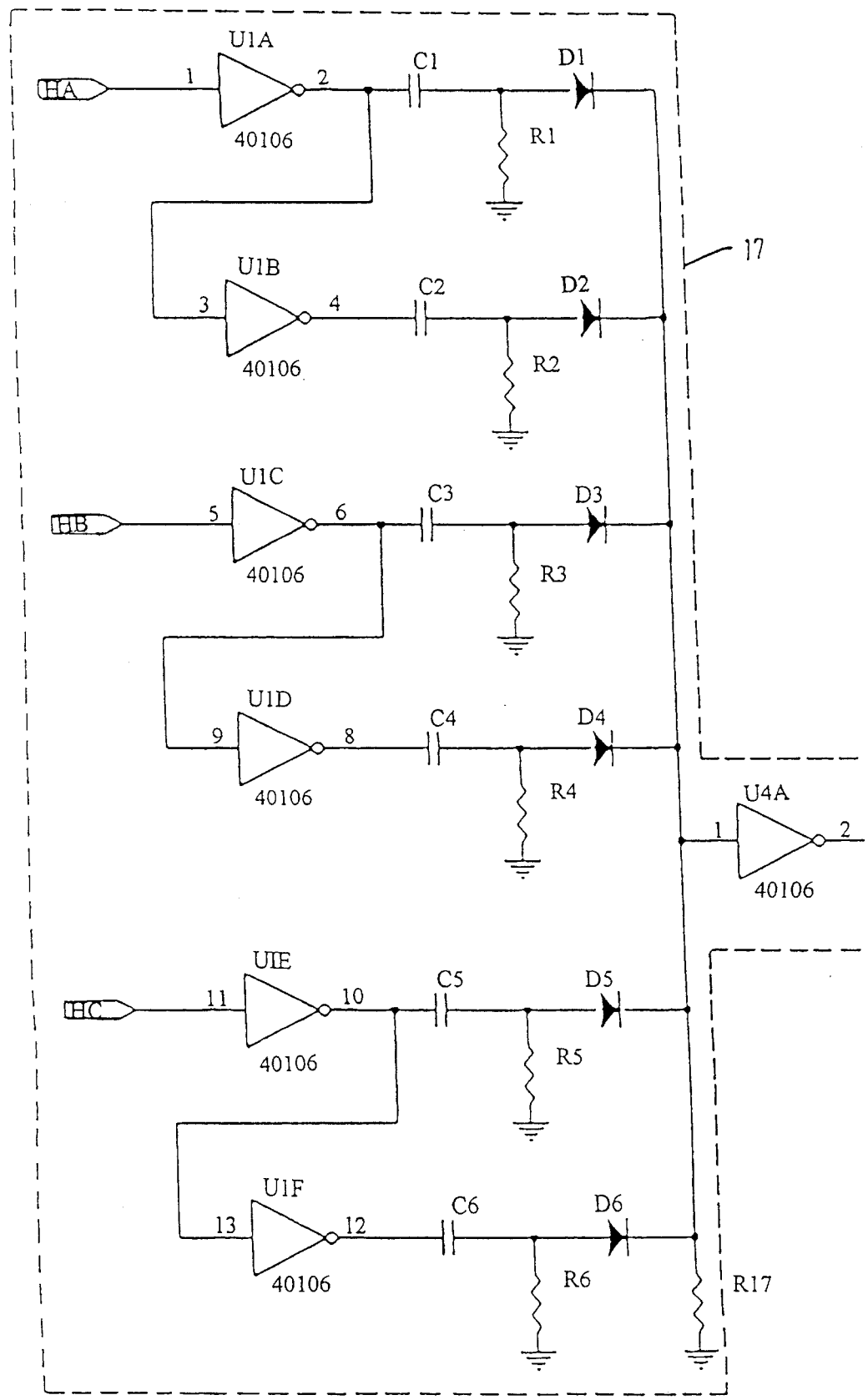
FIG. 4a and 4b are circuit diagrams, showing a preferred embodiment of the brushless DC motor speed controller according to the present invention.
Figures 2, 4A:
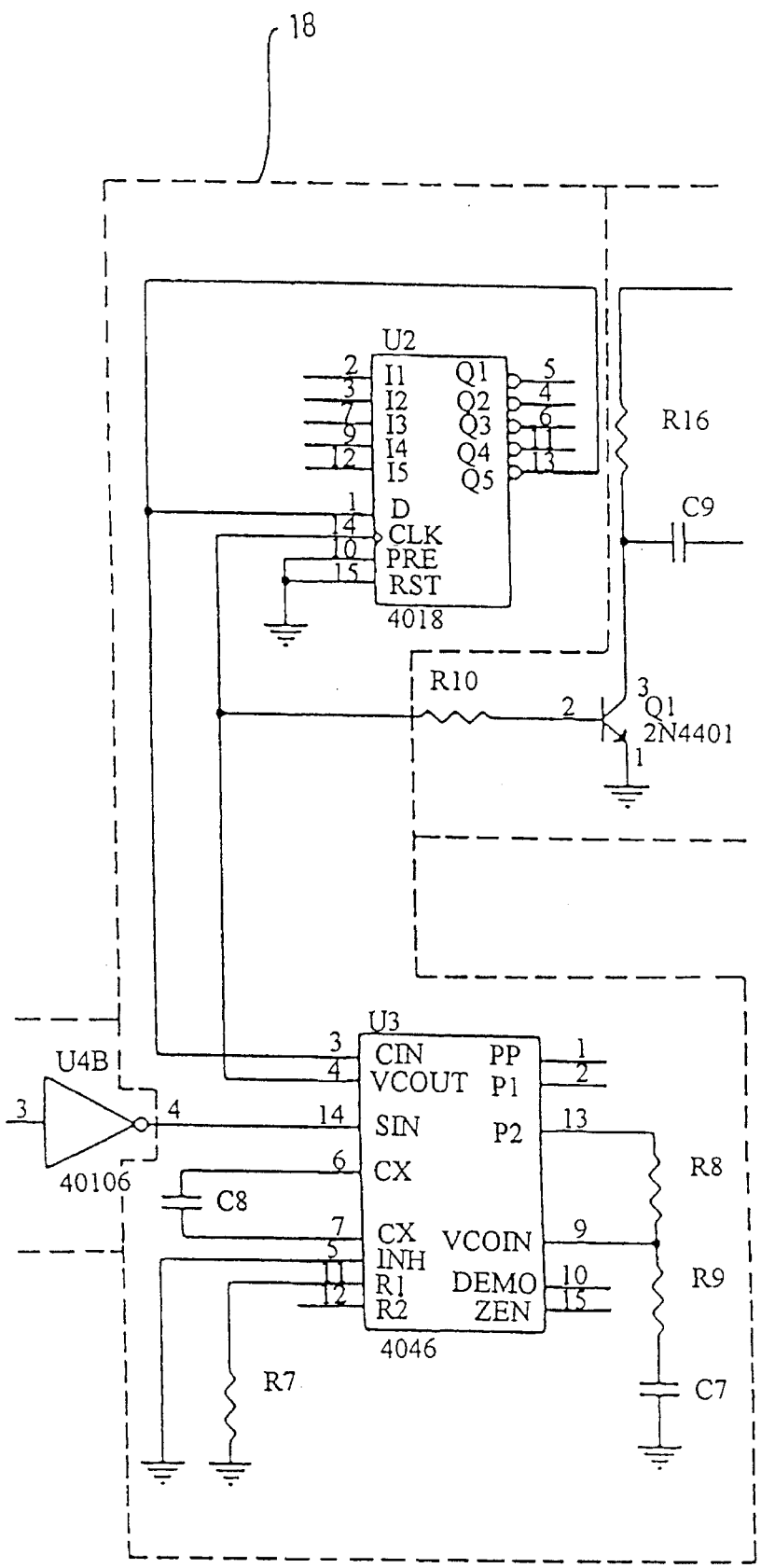
Figures 3, 4A:
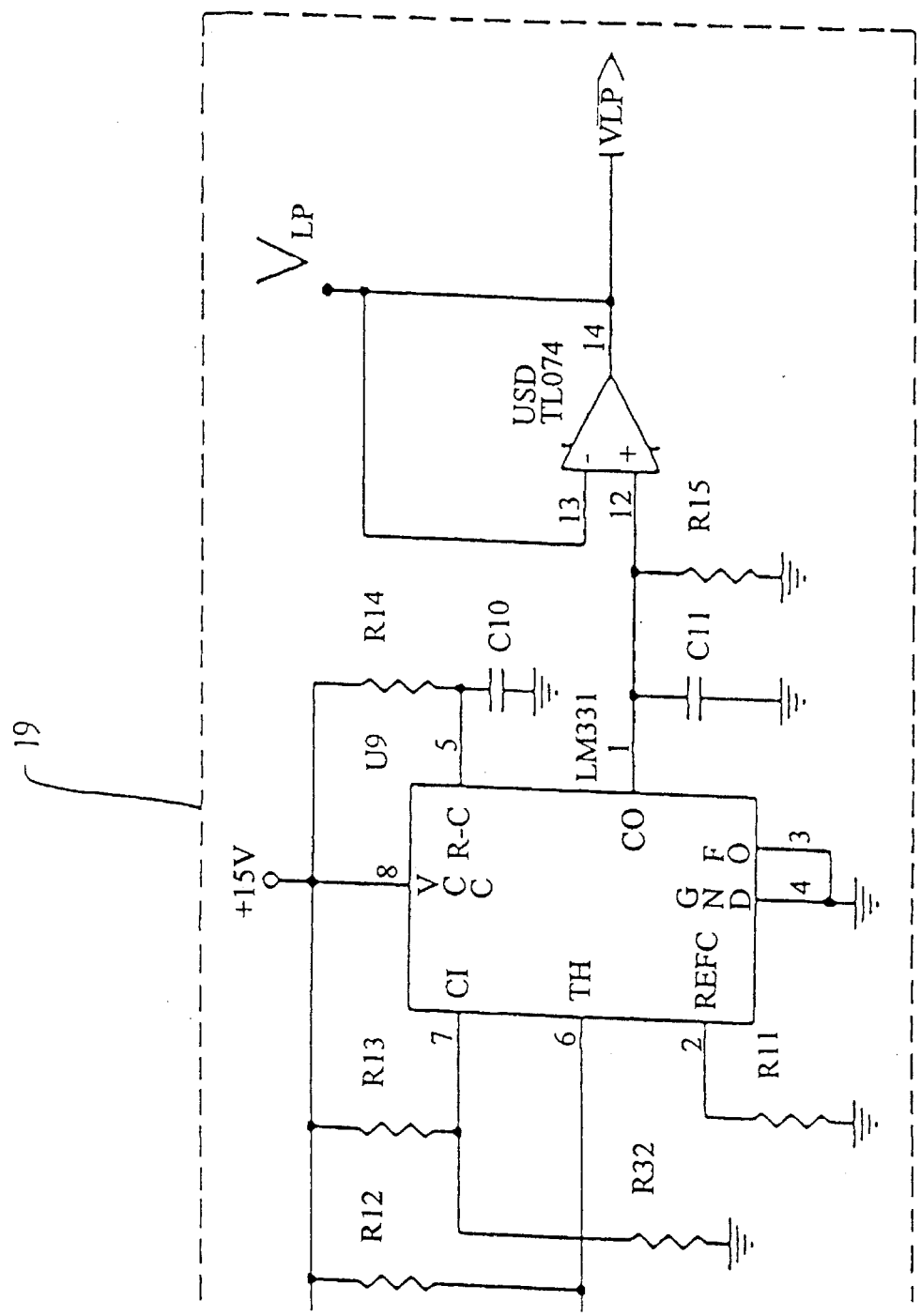
Figures 1, 4B:
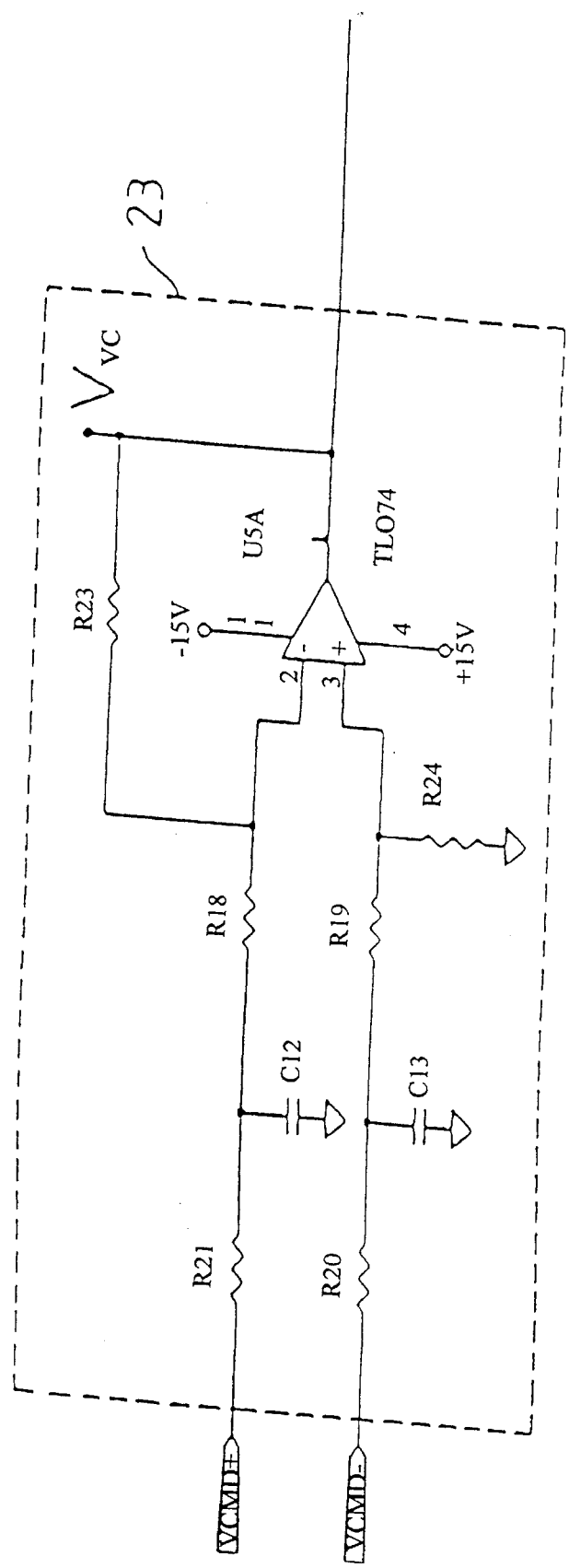
Figures 2, 4B:
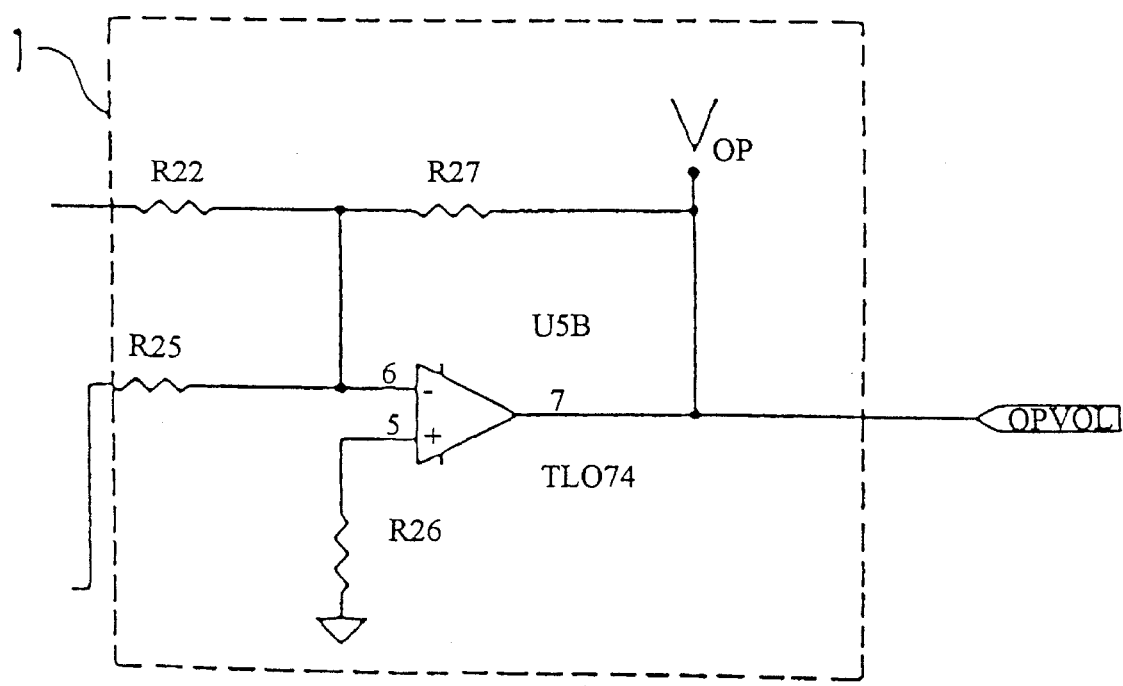
Figures 3, 4B:
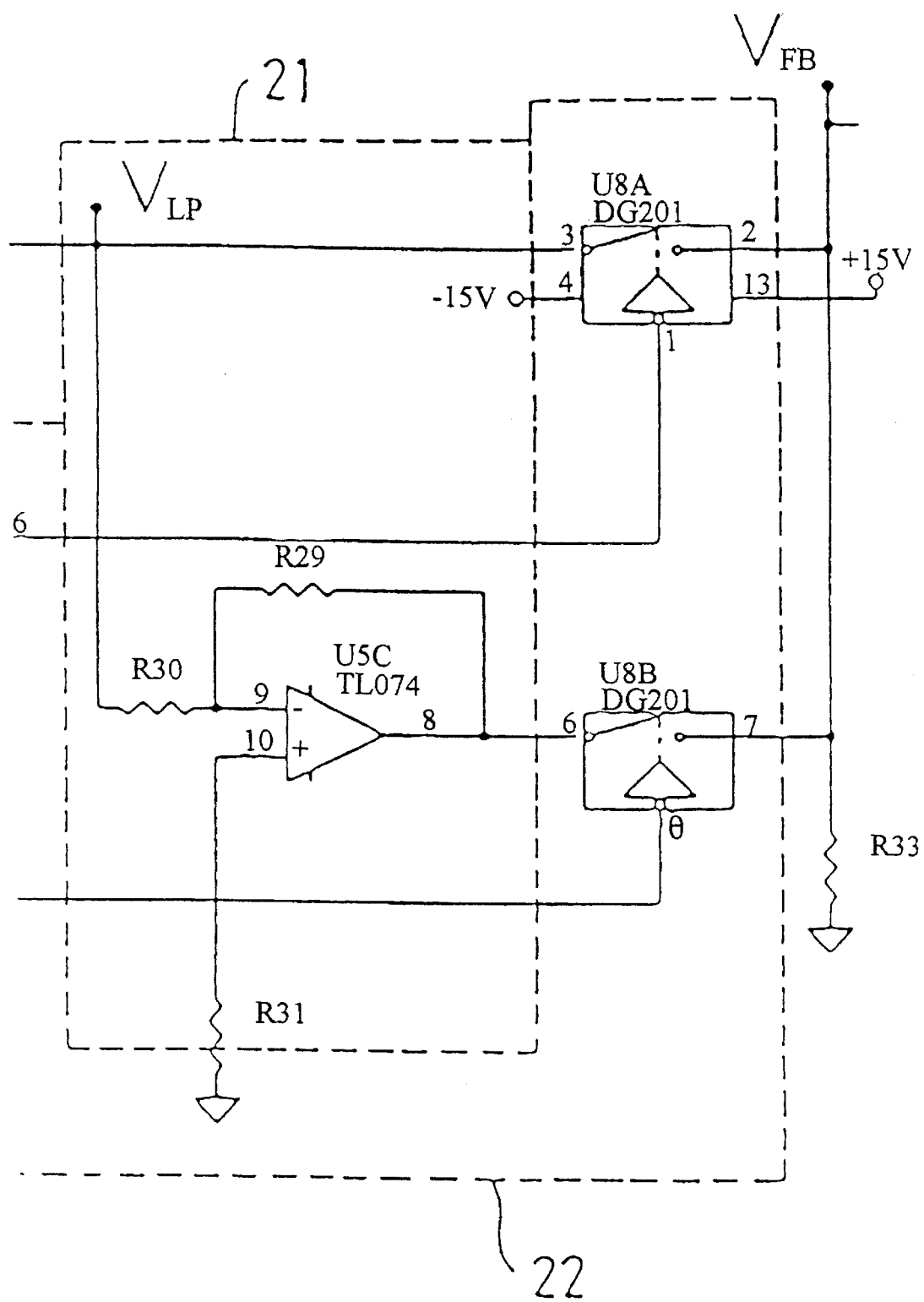
Figures 4, 4B:
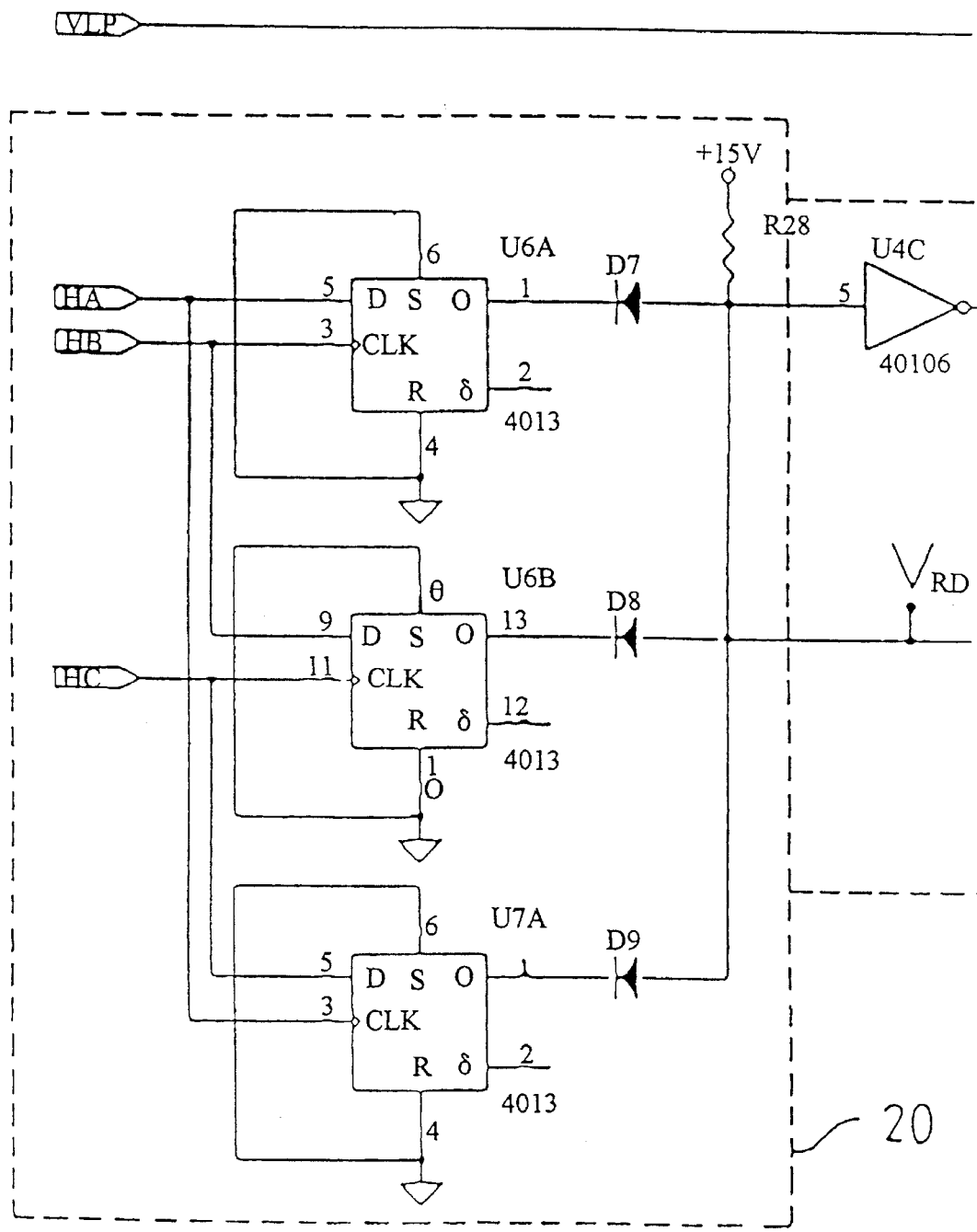

FIG. 4a and 4b show the circuit diagram of a preferred embodiment of the present invention. In the circuit, the commutation signals HA, HB, and HC from the magnetic-pole sensor 12 on the brushless DC motor 11 are processed along with the phase-inverted signals HA, HB, and HC in the edge detector 17. These signals are processed respectively by the differential circuits comprising the RC sets (R1, C1) to (R6, C6) to obtain a pulse train, each pulse is generated at the time when a rising or falling edge is detected. The pulse train is subsequently processed through D1–D6 and R17 to obtain a composite signal. In the circuit, the units U4A and U4B are used for wave-shaping.

In the block of the frequency multiplier 18, U3 is a CMOS phase-locked loop component such as CD4046, in which Phase Comparator II is used as the phase comparator. Its transfer function has a characteristic that allows the component to be functioning without frequency offsets. The resistor R7 and the capacitor C8 determine the output frequency range of the VCO. The unit U2 is a divide-by-10 counter and U2 and U3 constitute a 10× frequency multiplier.

In the block of the frequency-to-voltage converter 19, U9 can be an LM331 for performing frequency-to-voltage conversion, to output a positive analog voltage $V_{Lp}$ proportional to frequency $f_i$ multiplied 10 times by the input pulse train. In reference to the National Semiconductor Linear IC Data Book, the LM331 outputs the voltage $V_{Lp}$ in accordance with the following relationship:

$$V_{LP} = f_i \times 2.09 \times \frac{R15}{R11} \times R14 \times C10$$

The voltage $V_{Lp}$ is proportional to the motor speed.

To achieve the purpose of controlling the motor speed, a negative feedback is required. In other words, when the motor rotates in the CCW direction, the speed feedback signal $V_{FB}$ is a positive analog voltage; and when the motor rotates in the CW direction, the speed feedback signal $V_{FB}$ is a negative analog voltage. However, the speed feedback signal $V_{Lp}$ from the commutation signal processor is a positive analog voltage in proportion to the motor speed. Therefore, a rotating direction detecting circuit 20 composed of U6A, U6B, and U7A is provided. With this provision, $V_{Rd}$ is HIGH when the motor rotates in the CCW direction, causing the analog switch U8A in the analog multiplexer 22 to be shorted, thereby resulting in $V_{FB}=V_{Lp}$. On the other hand, when the motor rotates in the CW direction, the outputs of U6A, U6B, and U7A are LOW, causing $V_{RD}$ to be LOW. As a result, the U8B is shorted, causing $V_{FB}=-V_{Lp}$. These relationships are shown in the following:

$$V_{FB} = \begin{cases} V_{LP} & V_{RD} = \text{HIGH} \\ -V_{LP} & V_{RD} = \text{LOW} \end{cases}$$

The unit U5B in the speed compensator 1 is a proportional amplifier, whose output is as follows:

$$V_{OP} = -\left( \frac{R27}{R22} \times V_{VC} + \frac{R27}{R25} \times V_{FB} \right)$$

And this voltage is used to control the level of the voltage supplied to the brushless DC motor 11.

Since in the brushless DC motor speed controller according to the present invention elements such as as DC tachometer or encoder are not necessary while still allowing speed feedback control to be achieved, cost of manufacture of the brushless DC motor is significantly reduced.

The present invention has been described hitherto with an exemplary preferred embodiment. However, it is to be understood that the scope of the present invention need not be limited to the disclosed preferred embodiment. On the contrary, it is intended to cover various modifications and similar arrangements within the scope defined in the following appended claims. The scope of the claims should be accorded the broadest interpretation so as to encompass all such modifications and similar arrangements.

We claim:

1. A brushless DC motor speed controller to provide speed control for a brushless DC motor, said brushless DC motor has a magnetic-pole sensor for generating an output signal, and said brushless DC motor speed controller comprising:

(a) an edge detector connected to said magnetic-pole sensor, said edge detector generates a pulse each time a rising or falling edge is detected in the output signal from said magnetic-pole sensor of said brushless DC motor;

(b) a frequency multiplier connected to said edge detector for multiplying the frequency of the pulse train from said edge detector;

(c) a frequency-to-voltage converter connected to said frequency multiplier for converting the output pulse train from said frequency multiplier into a positive analog voltage, the level of the positive analog voltage being in proportion to the speed of said brushless DC motor;

(d) a motor rotating direction detecting circuit connected to said magnetic-pole sensor for receiving the output signal from said magnetic-pole sensor and detecting in which direction said brushless DC motor currently rotates;

(e) a feedback signal polarity analog multiplexer connected to said frequency-to-voltage converter and said motor rotating direction detecting circuit for receiving the positive analog voltage from said frequency-to-voltage converter and generating a positive or a negative analog signal as speed feedback signal in response to the rotating direction detected by said motor rotating direction detecting circuit; and (f) a speed compensator connected to said feedback signal polarity analog multiplexer, said speed compensor, which is a proportional amplifier or a proportional-integral amplifier, receiving both a speed command input and the speed feedback signal, for controlling the level of a DC voltage supplied to said brushless DC motor.

2. A brushless DC motor speed controller as claimed in claim 1, wherein said frequency multiplier comprises a phase-locked loop formed by inserting a frequency divider into a feedback loop between the output of a voltage-controlled oscillator and a phase comparator.

3. A brushless DC motor speed controller as in claimed in claim 1, wherein said speed compensator is a proportional-integral amplifier.

4. A brushless DC motor speed controller as claimed in claim 1, wherein said feedback signal polarity analog multiplexer comprises a phase inverter and a analog multiplexer.

5. A brushless DC motor speed controller as in claimed in claim 2, wherein said speed compensator is a proportional-integral amplifier.

* * * * *